March 16, 1926.　　　　　H. F. TOWNER　　　　　1,577,086
ATTACHMENT FOR TRACTORS
Filed Sept. 7, 1922　　　2 Sheets-Sheet 1

Inventor
HEBER F. TOWNER
Lyon & Lyon
Attorneys

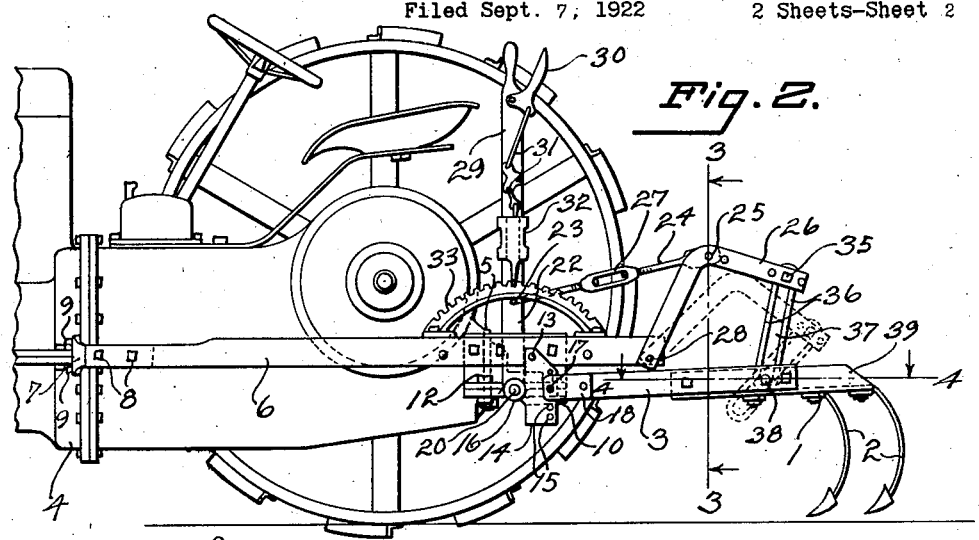
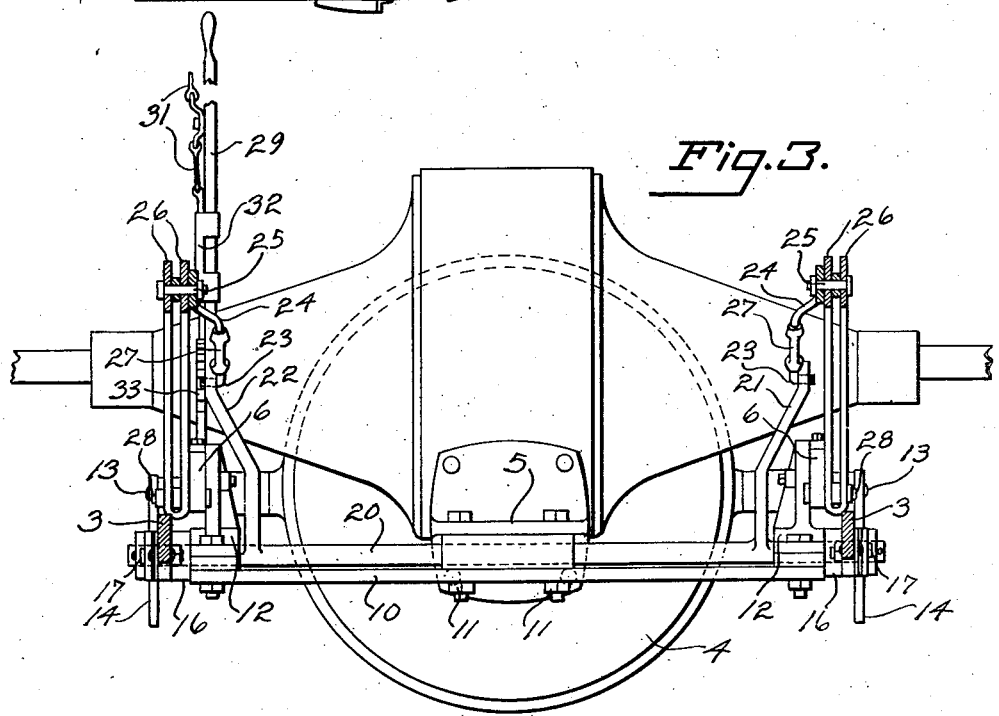
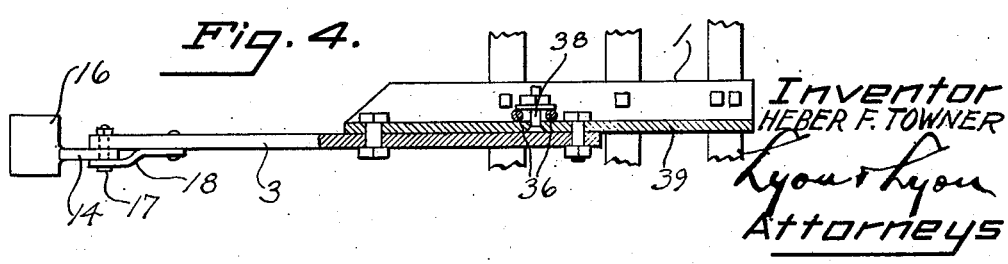

Patented Mar. 16, 1926.

1,577,086

UNITED STATES PATENT OFFICE.

HEBER F. TOWNER, OF SANTA ANA, CALIFORNIA.

ATTACHMENT FOR TRACTORS.

Application filed September 7, 1922. Serial No. 586,593.

*To all whom it may concern:*

Be it known that I, HEBER F. TOWNER, a citizen of the United States, residing at Santa Ana, in the county of Orange and State of California, have invented a new and useful Attachment for Tractors, of which the following is a specification.

This invention relates to draft attachments for tractors and is particularly directed to certain improvements in the general type of mechanism illustrated and described in my Patent No. 1,477,089 dated Dec. 11, 1923.

An object of the invention is to provide a mechanism of the above character for connecting ground working tools to a tractor and in which means are provided for compensating for variations in the parts of the tractor to which the attachment is connected.

Another object is to provide a mechanism by which a gang of ground working tools may be angled, that is to say, inclined transversely to cause a deeper penetration at one side than at the other side of the gang.

A further object is to improve the attachment in a manner whereby the depth of penetration may be predetermined independent of the operating mechanism and whereby the operating mechanism is relieved of the work of limiting the penetration of the tools, said mechanism having its principal utility in withdrawing the tools from the ground.

Various other objects and advantages will be more fully apparent from the following description of the accompanying drawings which form a part of this disclosure, and which illustrate a preferred form of embodiment of the invention.

Of the drawings:

Fig. 2 is a side elevation, omitting the near-traction wheel.

Fig. 3 is an enlarged fragmentary section on line 3—3 of Fig. 2, the wheels being omitted.

Fig. 4 is an enlarged fragmentary detail section on line 4—4 of Fig. 2.

Figure 1:
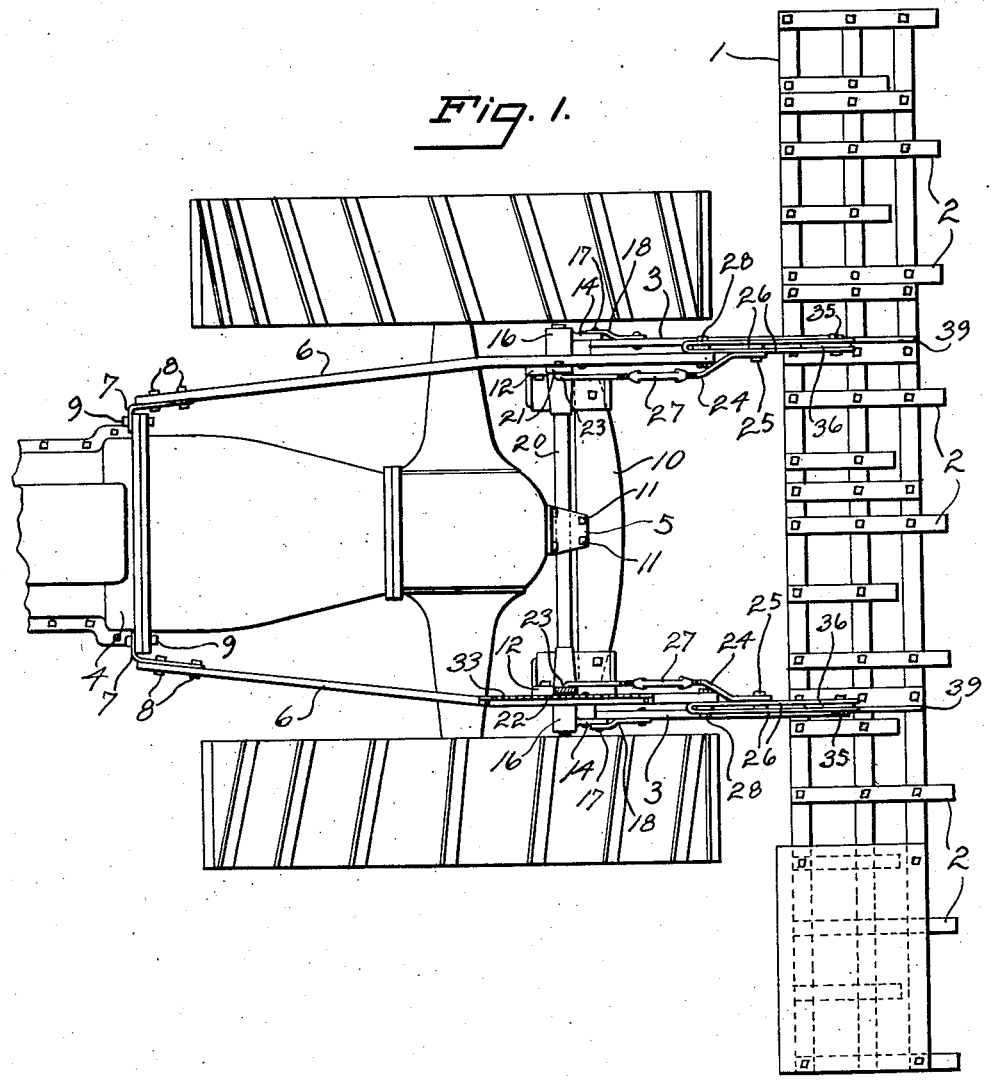
Figure 1 is a plan view of the attachment of the present invention applied to a standard type of tractor, only so much of the tractor being shown as is necessary to a clear understanding of the invention.

Referring to the drawings, 1 designates an implement frame of suitable construction, and 2 designates ground-working tools secured to the frame in spaced relation, it being understood that any form of ground working tool suitable for the work to be performed may be associated with said frame. The frame 1 is provided with transversely spaced arms 3 which extend forwardly and are adapted for attachment to a supporting or draft structure associated with the tractor.

The supporting structure is adapted for attachment to the tractor, and in the drawings there is shown a well known type of small tractor having a transmission housing 4 provided with a draw bar cap 5. (See particularly Fig. 3.) Such supporting structure includes a pair of draft bars 6 extending forwardly on opposite sides of the transmission housing 4 and provided at their forward ends with inturned ends or angle connections 7 connected to the bars 6 by bolts 8 and in turn connected to the flange of the transmission housing by bolts 9. In practice, two of the flange bolts on each side of said housing will be removed and longer bolts 9 substituted therefor for securing the draft bars 6 to the flange. A transverse bar 10 has its middle portion secured by bolts 11 to the draw bar cap 5, its opposite ends being rigidly connected to the respective draft bars 6 by brackets 12, all bolted together to form a rigid supporting structure which may be attached to a standard type of tractor. I provide relatively fixed pivots for the forward ends of the arms, together with means for supporting these pivots at different selective elevations. For this purpose, secured by a bolt 13 to the outer surface of each draft bar 6 is a depending plate 14 having a vertically disposed row of holes 15, each plate also having a hub portion 16.

The forward end of each of the frame arms 3 is positioned against the inner surface of the respective plate 14 and is selectively pivoted thereto by a removable bolt 17 engaging one of the holes 15, it being preferable to provide each of the arms 3 with a fixed end plate 18 engaging the outer surface of the respective plate 14, with each arm 3 and associated plate 18 having transversely aligned apertures to receive the respective pivot bolt 17 (see Fig. 4).

The operating mechanism includes a transverse rock shaft 20 which is journaled in the brackets 12 and in the hubs 16 of the plates 14, and which is provided with radial arms 21, 22, said arms being pivotally connected at 23 to respective extensible connecting rods 24 which extend rearwardly and are each in turn pivotally connected at 25 to angled levers 26. Means are provided for independently adjusting the rods or links 24. For this purpose the rods 24 each include a turnbuckle 27 by means of which its length may be varied to a fine degree, and the levers 26 are each pivoted at 28 to the rear end portion of the respective draft bar 6.

The radial arm 21 is just sufficiently long to connect with the associated rods 24, while the arm 22 extends further upward to form an operating lever 29 with which is associated a release lever 30 connected by the usual linkage 31 to a latch detent 32, said detent being adapted to engage with a notched quadrant 33 on the adjacent draft bar 6, so that the shaft 20 and associated mechanism may be maintained in different positions of adjustment.

The levers 26 carry bolts 35, and in the present instance, each lever 26 comprises a pair of spaced members and the bolt 35 extends through both members. Intermediate each pair of said members is a link 36 having an elongated slot 37 through which the bolt 35 engages, which slot also is engaged by a bolt 38 secured to an upright flange 39 of the implement frame 1. (See particularly Fig. 4). In this manner the levers 26 are loosely connected to the implement frame by the links, and the rear ends of the levers 26 overhang the bolts 38 so that the links 36 are nearly vertical.

From the above it will be understood that when the lever 29 is swung forwardly it will cause the levers 26 to be swung forwardly and upwardly so as to raise the implement frame and that a reverse motion of the lever 26 will permit a lowering of said frame.

In actual operation, and with the implement frame free from restraint, the tools 2 will penetrate into the ground to a full predetermined depth depending upon the pivotal connection of the frame arms 3 with the plates 14. In other words, the tools will tend to bury themselves into the ground until the frame 1 assumes a practically horizontal position (when cultivating the ground) conforming to the line of draft, whereupon the frame will without assistance maintain such position, this being due to the fact that a tilting of the frame downwardly to any considerable degree below the horizontal will induce an upward urge on the frame tending to counteract the downward drag of the tools, and when such upward urge and downward drag counterbalance each other, the tools 2 will remain at a uniform depth of penetration, depending upon the initial vertical adjustment of the arms 3 on the plates 14. This enables the implement frame to keep the cultivator tools in the ground when passing over hillocks.

In the preferred use of the implement, the pivot bolts 17 are initially set in the selected plate holes 13 which will produce a predetermined required depth of penetration of the tools, and the operating mechanism thereafter used only when desired to lower the tool frame and free it from restraint and when desired to withdraw the tools from the ground. When the implement is used in this manner, the levers 26 and links 36 will, during the soil tilling operation, be positioned as indicated in dotted lines in Fig. 2, permitting free movement of the tool frame either upwardly or downwardly, so that a tilting of the tractor in riding over uneven ground will have no effect upon the tool-frame and also to allow a free movement of the tool-frame in the event of the tools striking boulders or other obstructions in the ground. Thus during a soil-tilling operation, the operating mechanism will be entirely relieved of all strains.

Of course, it will be understood that if it is desired to limit the penetration of the tools to a lesser depth than the initial setting of the bolts 17 determine, and without resetting said bolts, the operating lever 29 will then be adjusted along the quadrant 33 and the detent 32 engaged therewith to maintain the operating mechanism in adjusted position, the links 36 maintaining the tools against penetration to the full depth of the initial setting. In such instance, the operating mechanism will be subjected to at least a part of the strain occasioned by a tilling operation.

A further major advantage of the mechanism disclosed, resides in its adaptability for attachment to tractors in which the parts attached may vary as to accuracy. It will be understood in this connection that if the draft cap 5 supplied with the tractor is not provided with a true horizontal face to be engaged by the transverse bar 10, said bar, and consequently the entire supporting structure will be out of horizontal alignment, that is, one side of the tool gang will be lower than the other. Such inaccuracies, as well as any inaccuracies in the parts of the operating mechanism, may be compensated for by manipulation of the turn buckles 26 to shorten or lengthen one or both of the rods 24.

Further, in the event that it is desired to purposely cause one side of the tool gang to penetrate deeper than the other, the turnbuckles 26 will be manipulated to shorten one of the rods 24 so as to warp the frame and tilt the same and hold one side of the tool-gang higher than the other side; for this purpose the implement frame is made with sufficient spring to the frame 1 and there should be sufficient looseness at the pivot bolts 17, to permit such adjustments.

If one of the pivot bolts 17 is attached in one of the holes 15 at a higher elevation than the corresponding pivot bolt 17 is attached in the opposite plate 14, the implement frame will be held in a position tilted from the horizontal. Such an adjustment may be desirable in making irrigating furrows. When the implement frame is supported in such a tilted position the adjusting devices 27 cooperate in such a way that the rods 24 can be lengthened or shortened as desired so that they will hold the links 36 in a position to correspond with the tilted position of the implement frame; by adjusting the connecting rods 24 in this way the links 36 will permit an equal amount of penetration of the cultivator blades and will also operate to pick up both sides of the implement frame simultaneously when the lever 29 is operated.

While I have shown and described a mechanism which is well adapted to fulfil all of the objects primarily stated, it is to be understood that I do not wish to limit my invention to the one form of embodiment herein disclosed, for it is susceptible of embodiment in various other forms, all coming within the scope of the following claims.

I claim:

1. In an attachment for tractors, the combination of a draft structure adapted for rigid connection with a tractor, an implement frame carrying ground working tools and having arms extending forwardly, relatively fixed pivots for the forward ends of the arms with means for supporting the pivots at different selective elevations, and means mounted on the tractor for lowering and raising said frame, said means including adjustable extensible members enabling the implement frame to be supported in a transversely tilted position.

2. In an attachment for tractors, the combination of a draft structure having means for rigidly connecting the same with the tractor, an implement frame having forwardly extending transversely spaced arms, means including relatively fixed pivots for pivotally supporting the forward ends of the arms on the draft structure, said means constructed to permit the attachment of the pivots at a plurality of points having different elevations respectively, a transverse rock-shaft journaled on said draft structure, and having an arm at each side of the tractor, transversely spaced levers pivoted on the draft structure, link connections respectively between said levers and the implement frame, and connecting rods between the arms and the levers including means for varying their respective lengths.

Signed at Los Angeles, California this 31st day of August, 1922.

HEBER F. TOWNER.